United States Patent [19]

Jarman et al.

[11] Patent Number: 4,513,508
[45] Date of Patent: Apr. 30, 1985

[54] VEHICLE BODY AND FRAME MEASURING DEVICE

[76] Inventors: Davis R. Jarman, 612 Ward Dr.; Virgil H. Hinson, 206 Fairway Oaks Dr., both of Brunswick, Ga. 31520

[21] Appl. No.: 550,088

[22] Filed: Nov. 9, 1983

[51] Int. Cl.³ .............................................. G01B 11/26
[52] U.S. Cl. ................................ 33/288; 33/180 AT; 33/281
[58] Field of Search ........... 33/180 AT, 181 AT, 281, 33/288, 299, DIG. 21

[56] References Cited

U.S. PATENT DOCUMENTS

| | | | |
|---|---|---|---|
| 3,566,476 | 3/1971 | McWhorter | 33/288 |
| 4,242,803 | 1/1981 | Dory | 33/288 |
| 4,329,784 | 5/1982 | Bjork | 33/288 |
| 4,366,624 | 1/1983 | Bergstrom | 33/288 |
| 4,442,608 | 4/1984 | Clausen | 33/288 |
| 4,454,659 | 6/1984 | Eck | 33/288 |

Primary Examiner—Richard R. Stearns
Attorney, Agent, or Firm—Harvey B. Jacobson

[57] ABSTRACT

An elongated wheeled bench is provided for predetermined aligned positioning beneath a stationary jack stand supported vehicle body to be straightened and includes, supported therefrom at one end, a vertically adjustable horizontally elongated mount extending transversely of the bench. The mount has a light beam generating head mounted thereon for adjustable positioning therealong and also for angular displacement relative thereto about a first axis paralleling the mount and a second axis disposed normal to the first axis. The head is operable to generate a narrow light beam disposed normal to the second axis and scales are provided to indicate angular positioning of the head about the first and second axes and also longitudinal positioning of the head along the mount.

9 Claims, 13 Drawing Figures

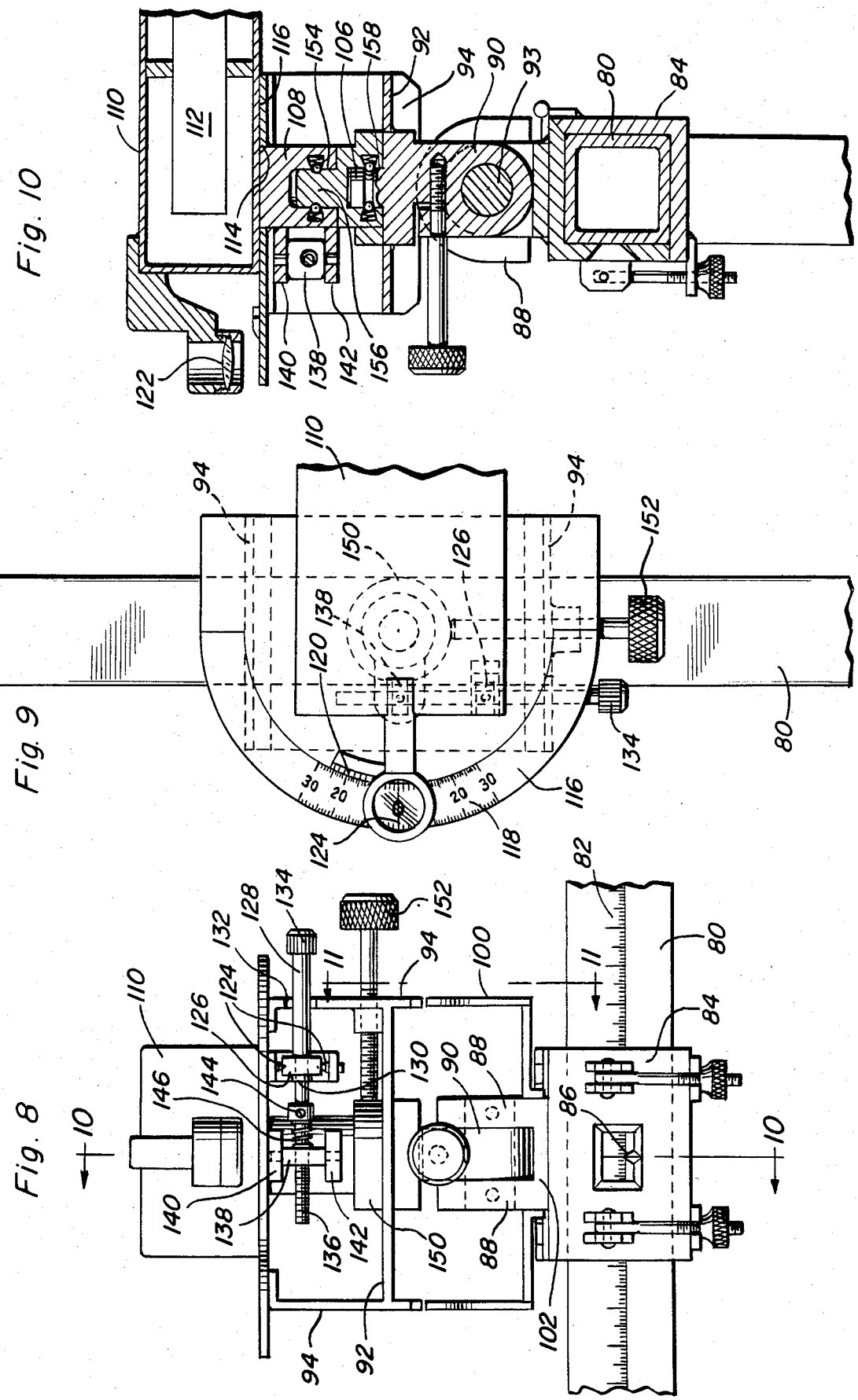

4,513,508

VEHICLE BODY AND FRAME MEASURING DEVICE

BACKGROUND OF THE INVENTION

Various different forms of structures relative to which a vehicle body may be mounted heretofore have been provided and at least some of these structures include datum line establishing means from which various vehicle body dimensions may be taken in order to determine whether or not a vehicle body or frame needs to be straightened. However, upper vehicle body component locations are difficult to measure relative to a datum line and the conventional method of making such measurements is time consuming and requires repeated reference to various different dimension tables. Accordingly, a need exists for structure by which the positioning of one vehicle frame or body component on one side of a longitudinal vertical center plane passing through an associated vehicle may be checked relative to the positioning of a corresponding component on the other side of the center plane. Further, an additional need exists to enable such positional determinations to be made quickly, easily and accurately without the need for continued reference to a manufacturers frame and body dimension table.

BRIEF DESCRIPTION OF THE INVENTION

The elongated bench of the instant invention is wheeled and low lying so as to be readily received beneath a vehicle frame and/or body stationarily supported in elevated position. The bench includes structure whereby it may be precisely aligned relative to the supported frame and/or vehicle body and a first end of the frame includes a vertically adjustable horizontally elongated mount extending transversely of the base and having a light beam generating head mounted thereon for adjustable positioning along the mount. In addition, the head is supported from the mount for angular displacement about a first axis paralleling the mount and a second axis disposed normal to the first axis. The head is operable to generate a narrow light beam disposed normal to the second axis and scales are provided to indicate the angular positioning of the head about the first and second axes and also positioning of the head along the elongated mount.

The main object of this invention is to provide a vehicle frame and/or body portion locating structure which may be used primarily to check the lateral positioning of similar right- and left-hand body or frame components relative to a center longitudinal vertical plane.

Another object of this invention is to provide an apparatus which may be used in at least two different ways to check the lateral spacing of similar right- and left-hand body and frame components from a center longitudinal vertical plane.

Still another object of this invention is to provide a frame and body portion location determining apparatus which may be quickly used to compare the lateral spacing of corresponding right- and left-hand body or frame components relative to a center longitudinal vertical plane without repeated reference to dimension tables.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is an enlarged fragmentary front elevational view of the light beam penetrating head of the instant invention and the central portion of the horizontal transverse mount from which the head is supported;

FIG. 9 is a fragmentary top plan view of the assemblage illustrated in FIG. 8;

FIG. 10 is a vertical sectional view taken substantially upon the plane indicated by the section line 10—10 of FIG. 8:

DETAILED DESCRIPTION OF THE INVENTION

Figure 1:
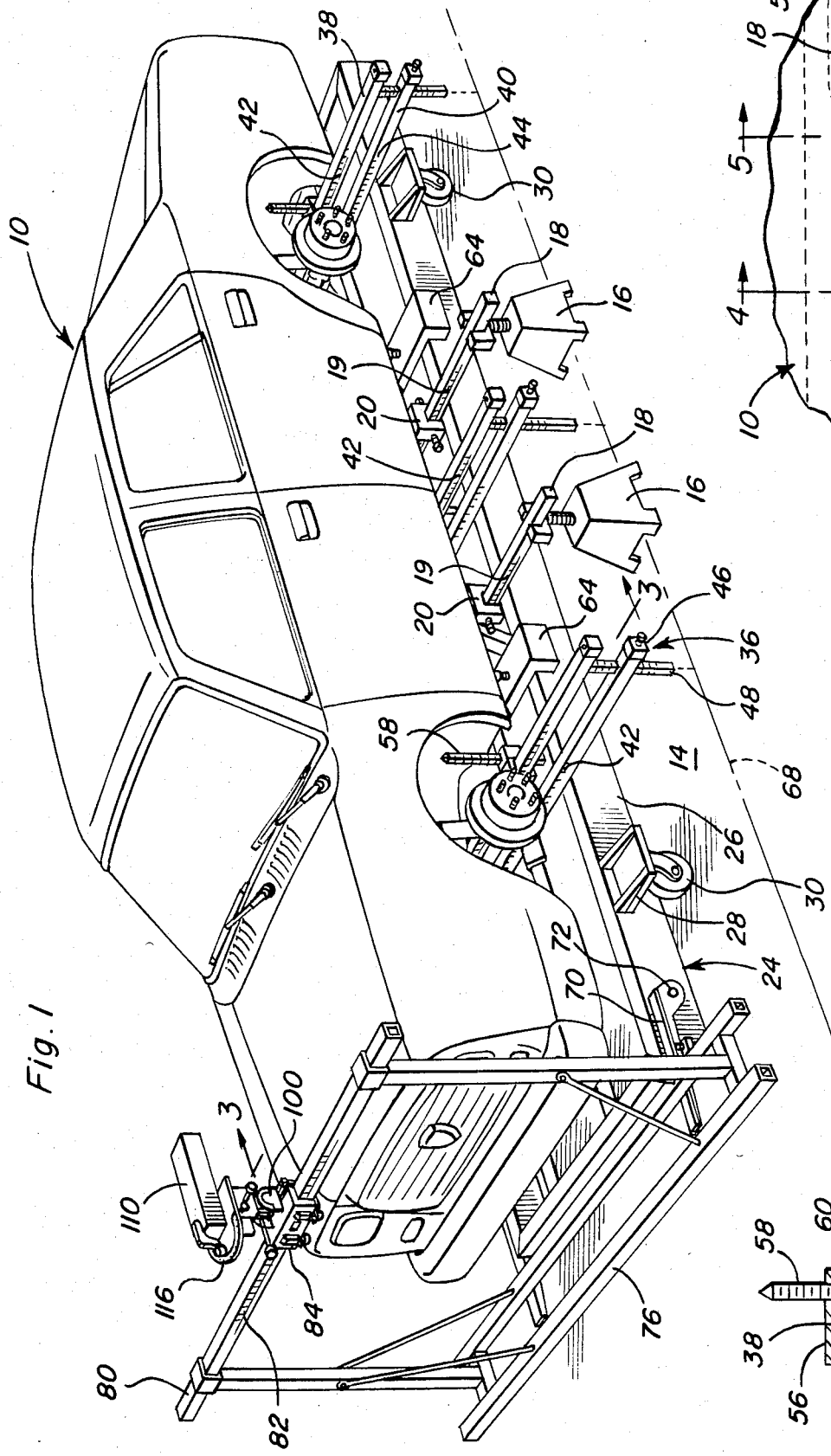
FIG. 1 is a perspective view illustrating a vehicle body with which the body and frame measuring device of the instant invention is operatively associated.
Figure 2:
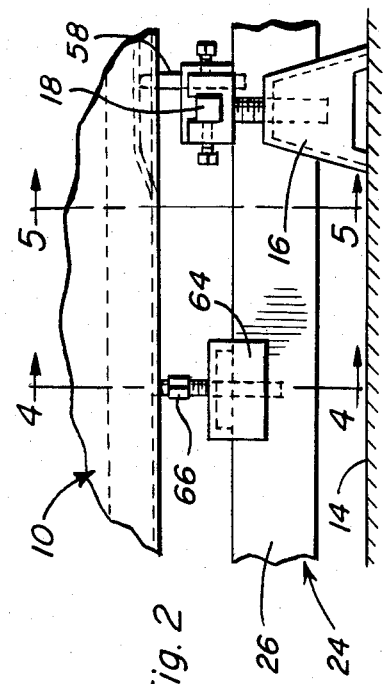
FIG. 2 is a fragmentary side elevational view of the lower central portion of the assemblage illustrated in FIG. 1.
Figure 13:
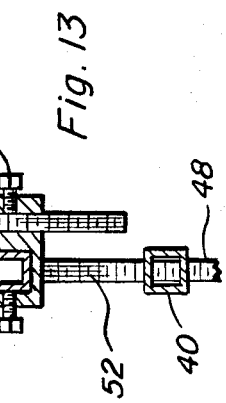
FIG. 13 is a vertical sectional view taken substantially on the plane indicated by the section line 13—13 of FIG. 12.

Referring now more specifically to the drawings, the numeral 10 generally designates a vehicle body including a unitized frame 12 and the body 10 is supported in elevated position relative to a floor 14 through the utilization of two pairs of jack stands 16. A support bar 18 extends between and is supported from each pair of jack stands 16 and each support bar 18 includes a pair of opposite end clamps 20 longitudinally slidable thereon. Further, the support bars 18 include scales 19 with which the clamps 20 are registrable and the clamps 20 are clamped engaged with the pinch wells of the unitized frame 12. In this manner, the clamps 20 may be precisely located relative to those initial reference points (pinch wells) utilized by the manufacture in initially setting the jigs used in the construction of the unitized frame 12.

After the vehicle body 10 has thus been supported, a horizontally elongated and wheeled bench referred to in general by the reference numeral 24 is rolled under the body in generally centered position relative thereto. The bench 24 includes a rectangular frame 26 incorporating four corner portions mounting horizontally laterally outwardly projecting brackets 28 from which caster wheel assembly 30 are supported. In addition, frame 26 includes cross bracing 32 and a pair of inverted V-shaped locator bars 34.

Figure 3:
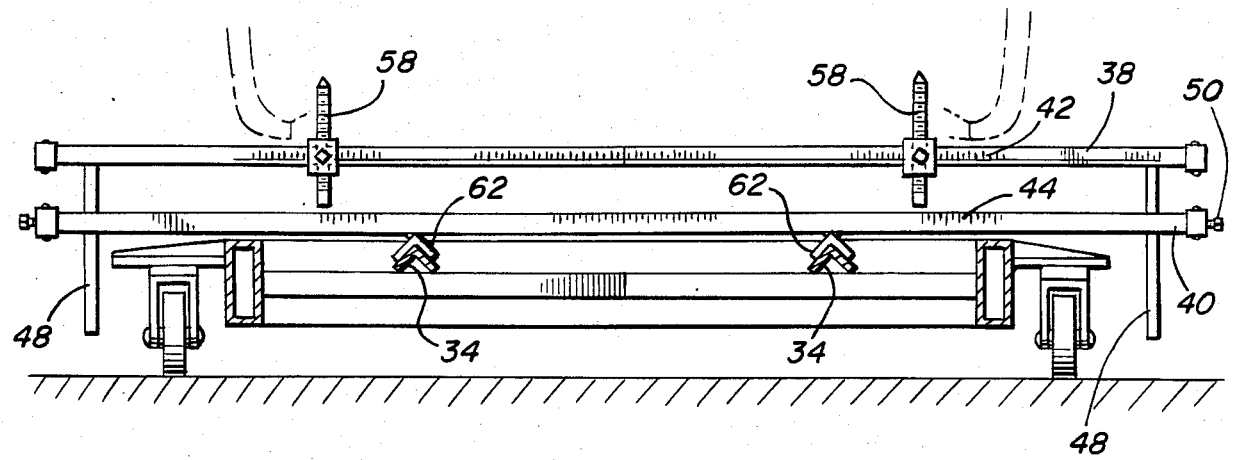
FIG. 3 is an enlarged transverse vertical sectional view taken substantially upon the plane indicated by the section line 3—3 of FIG. 1.
Figure 4:
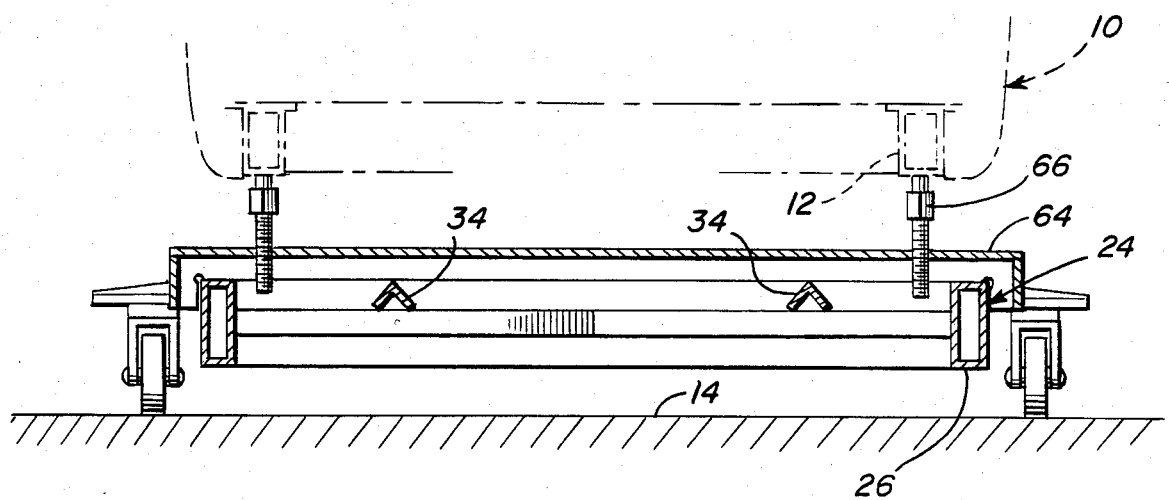
FIG. 4 is an enlarged transverse vertical sectional view taken substantially upon the plane indicated by the section line 4—4 of FIG. 2.
Figure 5:
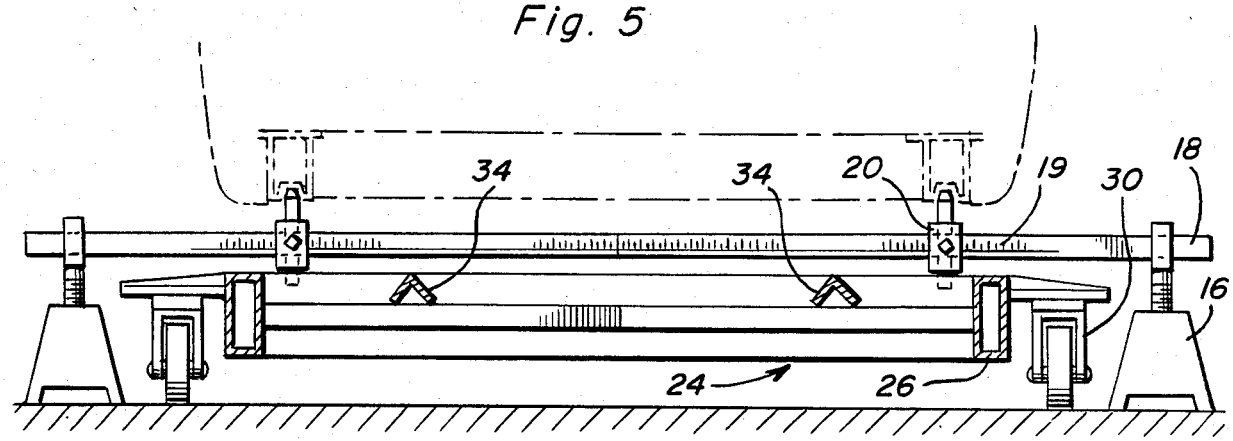
FIG. 5 is an enlarged transverse vertical sectional view taken substantially upon the plane indicated by the section line 5—5 of FIG. 2.
Figure 6:
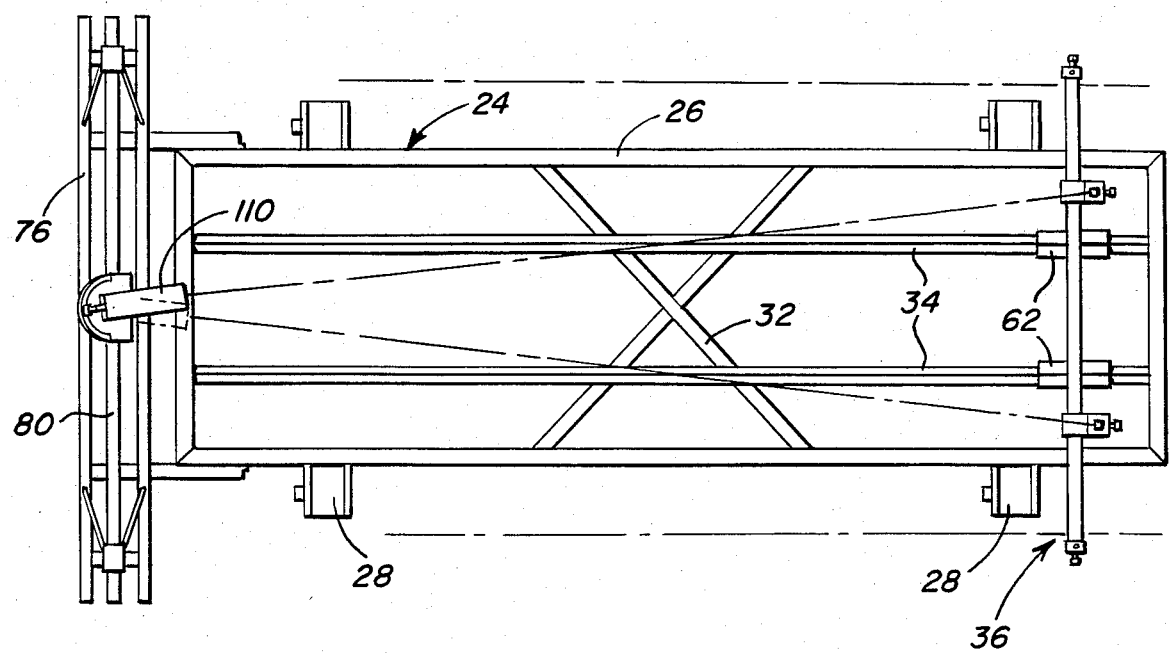
FIG. 6 is a top plane view of the measuring device of the instant invention.
Figure 7:
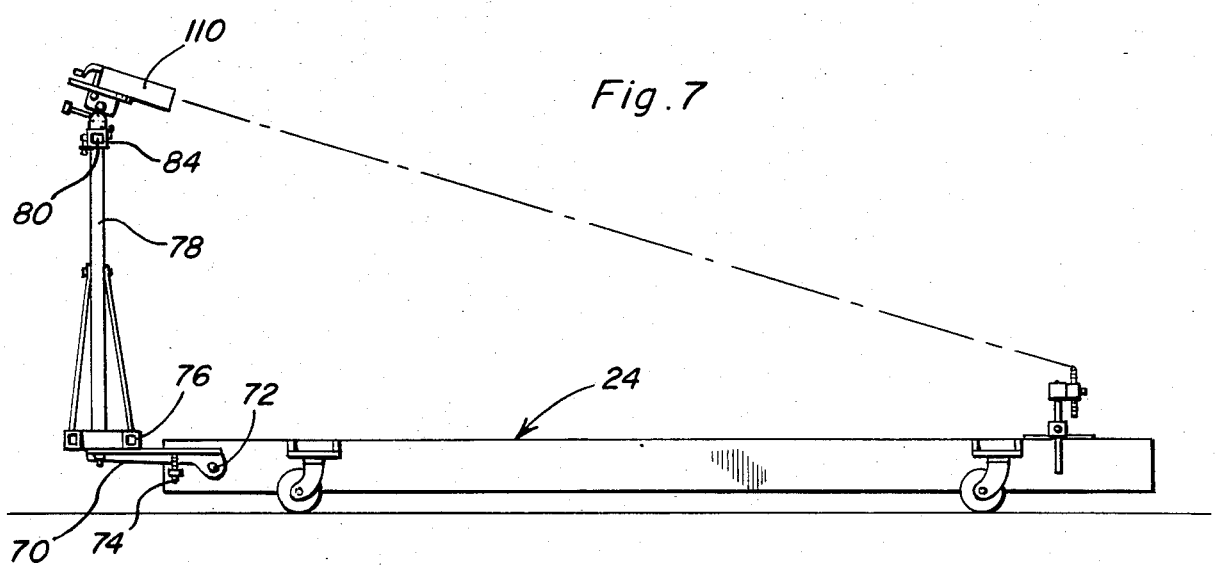
FIG. 7 is a side elevational view of the assemblage illustrated in FIG. 6.
Figure 11:
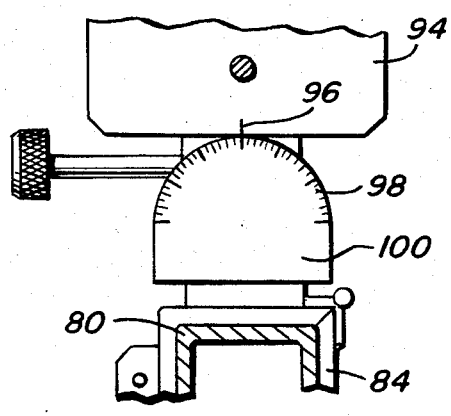
FIG. 11 is a fragmentary vertical sectional view taken substantially upon the plane indicated by the section line 11—11 of FIG. 8.
Figure 12:
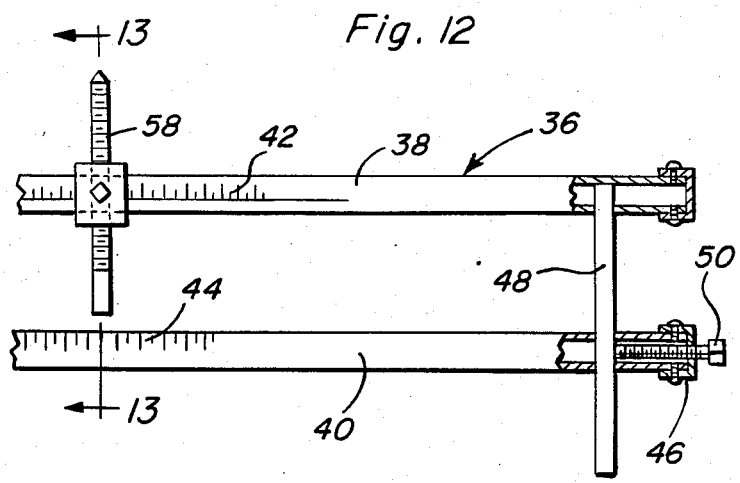
FIG. 12 is a fragmentary elevational view of one end portion of one of the three gauges supported from the bench and with portions thereof broken away and illustrated in vertical section.

Three or more gauges referred to in general by the reference numerals 36 are provided and each gauge 36 includes upper and lower tubular members 38 and 40 provided with longitudinal scales 42 and 44. Each end of the lower tubular members 40 includes an end cap 46 and a vertically elongated and slidable gauge member 48 is supported from and may be secured in adjusted elevated position relative to the corresponding tubular member 40 by a set screw 50 mounted from the corresponding end cap 46, each of the gauge members 48 including a scale 52 thereon. Further, each gauge member upper end is anchored relative to the corresponding upper tubular member end and each of the upper tubular members includes a sleeve 56 slidable therealong and which supports its own vertically adjustable upstanding gauge member 58 which may be retained in vertically adjusted position by a set screw 60. Each lower tubular member 40 further includes a pair of transverse downwardly opening inverted V-shaped followers 62, see FIGS. 3 and 6, slidably and supportively engaged with the locator bars 34 and the gauge members 48 and 58 may be used in a conventional manner in conjunction with the scales 42 and 44 for determining when the bench 24 is properly centered beneath the vehicle body 10.

Still further, the bench 24 additionally includes transverse bars 64 adjustably and slidingly supported therefrom and the bars 64 mount jack screws 66 therefrom which may be threaded upwardly into contact with under side portions of the vehicle body 10 in order to exert a downward force on the bench 24 after it has been centered relative to the vheicle body 10 in order to maintain the bench 24 in centered position.

The gauge members 48 may be used to establish a datum line 68, see FIG. 1, and the spacing between the datum line 68 and various predetermined points on the vehicle 10 may be measured and checked against manufacturer's dimension tables provided for that purpose. The use of a datum line for such purposes is old.

The front end of the bench 24 includes opposite side forwardly projecting support arms 70 pivotally mounted therefrom as at 72 and having adjustment screws 74 mounted from the frame 26 operatively associated therewith whereby a horizontally elongated gauge frame 76 may be supported from the free forward arms 70 in properly leveled position. The gauge frame 76 supports a pair of uprights 78 therefrom, and the upper ends of the uprights 78 are interconnected by a horizontally elongated mount bar 80 having a longitudinal scale 82 thereon, see FIG. 8. A clamp-type sleeve 84 is provided and mounted upon the mount bar 80 for adjustable positioning therealong. The sleeve 84 includes a pointer 86 registrable with scale 82 and a pair of upwardly projecting mounting flanges or ears 88 between which a depending clamp-type mounting ear 90 carried by a mounting plate 92 is oscillatably supported by a pivot pin 93 secured through the ears 88 and received through the clamp-type ear 90. Thus, the mounting plate 92 is mounted for oscillation relative to the bar 80 about an axis which parallels the bar 80.

The mounting plate 92 extends between a pair of upstanding side plates 94 each equipped with a tic 96 registrable with protractor scales 98 carried by protractor plates 100 mounted from a base portion 102 which interconnects the lower ends of the ears 88. Thus, the angulation of the mounting plate 92 about the pivot pin 93 may be readily determined by the registry of the tics 96 with the scale 98.

The mounting plate 92 supports an upstanding journal post 106 and a mount 108 is journalled therefrom. The upper portion of the mount supports an elongated horizontal housing 110 in which a narrow light beam generating head 112 is supported. The head 112 may be of the laser light beam generating type, if desired.

The mount 108 is rotatably received through an opening 114 formed in a top plate 116 mounted from and extending between the side plates 94 and the top plate 116 includes a protracter scale 118 thereon and shiftabley supports an arcuate vernier scale member 120 therefrom. In additon, the front of the housing 110 includes a magnifying glass 122 equipped with a hair line 124 for registry with the scale 118 and the vernier scale member 120.

The top plate 116 supports opposed upper and lower mounting points 124 therefrom and a sleeve 126 is oscillatably supported from the mounting points 124 and rotatably receives a shouldered adjustment shaft 128 therethrough equipped with a removal snap ring 130. One end of the shaft 128 projects outwardly through an enlarged window 132 provided in the right-hand side plate 94 (see FIG. 8) and is equipped with an adjusting knob 134. The other end of the shaft 128 is threaded as at 136 and is threadedly received through a nut 138 oscillatably supported from a pair of upper and lower mounting flanges 140 and 142 supported from the mount 108. A stop collar 144 is adjustably positioned on the shaft 128 and a coiled compression spring 146 is disposed between the nut 138 and the collar 144 to take up the clearance in the threaded connection between the screw 128 and the nut 138. Accordingly, the shaft 128 may be turned to angularly adjustably displace the mount 108 about the journal post 106. In addition, see FIG. 10, the journal post 106 includes a diametrically enlarged lower end disc 150 with which a threaded set screw 152 supported from the right-hand side plate 94 is operatively associated. The set screw 152 may be tightened against the disc 150 in order to prevent its angular displacement relative to the journal post 106. The mount 108 defines a downwardly opening non-circular recess 154 in which a non-circular post 156 is removably snugly received and the lower end of the post 156 includes a cylindrical recess 158 rotatably mounted on the post 106.

In operation, after the bench 24 has been properly centered beneath the vehicle body 10 and removably secured in position relative thereto by the jack screws 66, the sleeve 84 may be centered on the bar 80 and the light beam generating head 112 may be adjusted to concentrate a beam of light upon a predetermined area of the body 10 disposed on either the right- or left-hand side thereof. At this point, the scale 118 may be read through the magnifying glass 122 and the shaft 128 may then be turned to cause the housing 110 to swing toward the opposite side of the vehicle body 10 until the hair line 124 indicates the same reading on the opposite side of the scale 118. Then, the set screw 152 is tightened and the location of the light beam as incident upon the opposite side of the vehicle body may be noted. If there is any difference between the point of incidence of the light beam on the corresponding right- and left-hand components of the vehicle body 10, appropriate steps may be used to pull or push that portion of the body into proper position. In addition, the housing 10 may be locked in position with the hairline 124 centered on the scale 18 and the clamp screws 160 may be loosened in order to enable a sleeve 84 to be shifted along the bar 80. In a first position of the sleeve 84 along the bar 80, the light beam emitted from head 112 may be directed upon a given portion of the right-hand side of the vehicle body after the clamp sleeve 84 has been tightened and clamp sleve 84 may then be loosened so as to permit its sliding movement along the bar 80 to the other side of the center line of the body 10 with the pointer 86 registered with the corresponding scale indicia. Then, after the sleeve 84 has been locked in position, the point of incidence of the light beam generated by the head 12 on the second side of the vehicle body may be noted and appropriate body straightening procedures may be carried out.

Of course, the clamp-type ear 90 may be loosened in order to allow the housing 110 to be angularly displaced about the pivot pin 94 as desired.

It may therefore be seen that after the bench 24 has been properly aligned with the vehicle body 10 numerous checks between the right- and left-hand portions of the vehicle body 10 may be readily made independent of reference to datum line measurement or other measurement charts. These checks may be quickly effected and may be made either by using the degree scale 118 or the linear scale 82.

It is also to be noted that the mount bar 80 may be supported from the gauge frame 76 independent of the uprights 78 and therefore that various under side portions of the vehicle body may also be checked. Further, if the windshield of the vehicle body 10 has been removed, checks in the positioning of corresponding right- and left-hand side internal components of the body 10 may also be accmplished by directing the light beam generated by the head 12 through the windshield opening of the vehicle body 10. In this manner, door hinge location points and other internal points of the vehicle body 10 may be readily checked as to their spacing and elevation relative to a longitudinal center reference axis disposed in a vertical plane passing through the pointer 86 and intersecting with the center axis of the pivot pin 94.

It is pointed out that the manufacturers of each of the several hundred different models of vehicle bodies which have been manufactured in the last few years and to be checked and straightened has published between 22 and 24 different frame location dimensions which may be checked. However, the published charts containing these dimensions often include errors and the charts pertaining to foreign manufactured vehicles are often not available for two years.

However, with the instant invention, once the bench 24 has been properly aligned relative to the vehicle 10, the dimensional spacing of corresponding right- and left-hand frame components relative to a center vertical longitudinal plane may be readily checked without the aid of such dimensional charts.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An elongated bench for centered positioning beneath a stationarily supported vehicle body, an elongated linear scale equipped horizontal mounting bar supported from one end of said bench, a light beam generating head, a follower mounted on said bar for adjustable positioning therealong, means mounting said head from said follower for adjusted and predetermined angular displacement relative thereto about a first axis paralleling said bar and a second axis disposed normal to the first axis.

2. The bench of claim 1 including means supporting the opposite ends of said bar from said bench for vertical adjustment relative to opposite side portions of said one end.

3. The bench of claim 2 including ground engaging wheels supported from said bench for ease in positioning said bench between a vehicle body stationarily supported in elevated position from a floor surface with which said bench wheels are engaged.

4. The bench of claim 3 including screw jacks supported from said bench for upward engagement with under surface portions of said vehicle body to transfer some of the weight of said body to said bench and establish frictional contact between said bench and vehicle body and prevent shifting of said bench on said surface relative to said vehicle body.

5. The bench of claim 1 including vertically and horizontally adjustable scale equipped pointer means supported from said bench for checking the horizontal and vertical positioning of under side components of said vehicle body relative to said bench.

6. The bench of claim 5 including means supporting opposite ends of said bar for vertical adjustment relative to opposite side portions of said one end of said bench.

7. The bench of claim 6 including ground engaging wheels supported from said bench for ease in positioning said bench between a vehicle body stationarily supported in elevated position from a floor surface with which said bench wheels are engaged.

8. In combination with a horizontal support bar positionable normal to a center vertical longitudinal plane of a stationarily supported vehicle body and wherein said bar includes linear scale means extending in opposite longitudinal directions along said bar from a center point thereon through which said plane passes, a light beam generating head, a follower mounted on said bar for adjustable positioning therealong, means mounting said head from said follower for adjusted and predetermined angular displacement relative to said follower about a first axis paralleling said bar and a second axis disposed normal to the first axis.

9. The method of determining existing differences in elevation and lateral displacement of corresponding opposite side portions of a vehicle body from a center longitudinal axis of said vehicle body, said method including establishing a horizontal guide axis disposed normal to a vertical plane containing said center longitudinal axis, supporting a mount for adjustable positioning along said guide axis predetermined distances on opposite sides of said plane and for angular displacement of said mount about said guide axis, providing a narrow light beam generating head supported from said mount for angular positioning about a third axis normal to said guide axis, directing the light beam generated by said head on a selected component portion on one side of said vehicle for which there is a corresponding component portion on the other side of said vehicle, noting the linear positioning of said mount along said guide axis relative to said plane and the angular positioning of said head about said third axis, and thereafter reverse positioning said head along said guide axis and relative to said third axis and noting whether or not the light beam generated by the head is incident upon said corresponding component portion.

* * * * *